Oct. 2, 1923. 1,469,558
J. HARRIS
INDUCTION WATTMETER
Filed Jan. 26, 1920
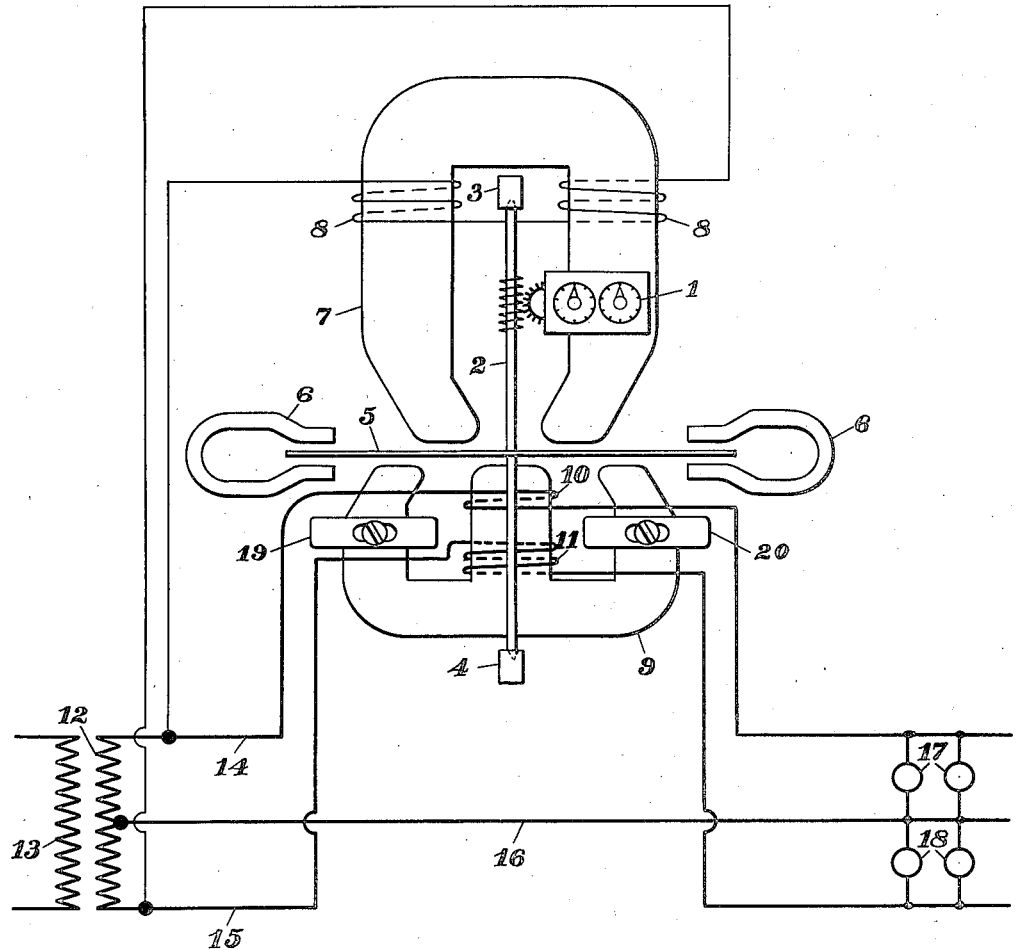
Inventor:
Jesse Harris,
By G. L. Cragg Atty.

Patented Oct. 2, 1923.

1,469,558

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

INDUCTION WATTMETER.

Application filed January 26, 1920. Serial No. 354,274.

*To all whom it may concern:*

Be it known that I, JESSE HARRIS, a citizen of the United States, residing at La Fayette, in the county of Tippecanoe and State of Indiana, have invented a certain new and useful Improvement in Induction Wattmeters, of which the following is a full, clear, concise and exact description.

My invention relates to an induction watt meter employed in connection with a plurality of load or working circuits and having co-axial load or current windings respectively individual to said circuits and located at different distances from the closed conductor meter armature that is in inductive relation with said current windings and the pressure winding of the meter.

My invention is of particular service when embodied in an induction watt meter employed in connection with electrically interrelated working circuits, such as are embraced in a three-wire system of alternating current distribution.

In a meter of the class to which my invention relates the current windings should be arranged so that the effective or torque producing actuating magnetic fluxes due thereto are equal per unit of energy and in phase with the currents flowing in their circuits. Where the current windings are at unequal distances from the armature and have equal ampere turns, this result cannot be achieved since there is more leakage of the flux set up by the further current winding than of the flux set up by the other current winding.

In a three wire meter of small capacity and employing two current windings of a considerable number of turns of small wire, approximately correct results may be obtained by winding the coil further from the armature with more turns than the nearer coil to compensate for the greater leakage of the flux that is generated by the more remote coil. This is a step by step method, the steps getting larger as the capacity of the meter increases, making close adjustment less and less possible.

In the larger size meters it has been attempted to secure the desired adjustment by shunting part of the current supplied to the stronger or nearer current winding. This method of adjustment would suffice were it not for the fact that the flux due to the shunted current winding is lagged. In a meter provided with two current windings one of which is thus shunted, a perfect balance of torque can be obtained for any predetermined power factor, but it is impossible to adjust the flux that is due to both current windings to be in quadrature with the potential flux at all times. A meter that is adjusted so that the flux due to one current winding leads such quadrature relation by the same amount that the flux due to the other current winding lags, can be used with perfect accuracy on three-wire circuits where the power factors of both working circuits or branches of the system are always the same, as the recording action due to one current winding will be fast and the recording action due to the other current winding will be correspondingly slow. But when the power factors are different the record of such a meter would obviously be very inaccurate.

To overcome these difficulties and to produce a meter that is easily adjusted and accurate under all conditions of power factor and load, I employ a magnetic deflector or deflectors for deflecting some of the flux, that is due to one of the current windings, from the armature.

I will explain my invention more fully by reference to the accompanying drawing diagrammatically illustrating a system of alternating electric current distribution employing the preferred form of meter of my invention.

The meter illustrated includes any suitable integrating or revolution counting mechanism 1 which is operated by the upright meter shaft or spindle 2 suitably supported at its ends in bearings 3, 4. Said spindle carries a closed conductor in the form of a disc 5, preferably made of aluminum. This disc may serve as an armature to constitute a part of the motive element of the meter and also preferably serves as an element of a damping device which turns in a constant magnetic field furnished by one or more damping permanent magnets 6, in accordance with common practice. The armature 5 is subject to magnetic flux from the potential winding passing therethrough from the poles of the U-shaped magnet core 7 that is perpendicular to and on one side of the armature disc 5 and is provided with the shunt winding 8. An E-shaped core 9 is perpendicular to and upon the other side of the armature disc. The middle leg of core 9 is wound with current windings or coils 10 and 11 respectively included in the mains of the system and co-operating with the meter armature to produce torques that should be adjusted to be substantially equal per unit of energy. The source of current, in the embodiment of the invention illustrated, is the secondary 12 of a transformer whose primary 13 is suitably connected with a generating station. The pressure winding 8 is connected in parallel with the source 12. The mains 14, 15 extend from the secondary terminals and constitute sides of working or load circuits having a neutral conductor 16 extending to the middle of the secondary, in accordance with well known three wire practice. Translating devices 17, such as incandescent lamps, are connected in bridge between the main 14 and the neutral conductor 16. Similarly, translating devices 18 are connected in bridge between the main 15 and said neutral conductor.

In the embodiment of the invention illustrated two adjustable magnetic deflectors 19 and 20 are provided on or at each outer leg of the E-shaped core 9, each deflector being so located as to deflect some of the flux from the armature that is due to the current winding 11 that is further from the armature than the current winding 10. The two deflectors are so arranged that the torque upon the armature which is due to one deflector is counteracted by the opposite torque upon the armature due to the other deflector. In constructing and adjusting the meter the current winding 11 is given more ampere turns than the increase which would be sufficient to compensate for the greater distance of this winding from the armature to afford a range of adjustment for the magnetic deflectors. The meter is connected in circuit with a definitely known load at 17 with no load at 18 and the torque of the meter, due to the sole current winding 10, is noted. Thereafter the load circuit containing current winding 10 is opened and a load is supplied at 18 equal to the load that was supplied at 17, whereupon the torque of the meter, due to the sole current winding 11 is adjusted, by movement of both deflectors 19 and 20, until the torque previously secured by means of winding 10 when acting alone is secured by means of winding 11 acting alone. The deflectors serve to deflect the requisite amount of flux, due to the further winding 11, from the armature to make the recording effects of the two current windings proportional to the corresponding loads, these torques due to these two current windings being equal per unit of energy. The adjustments of the deflectors should be such that the forward or backward torque due to one will be offset by the backward or forward torque due to the other.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An induction watt meter including a closed conductor disc armature; a pressure coil in inductive relation to and upon one side of the armature and having a U-shaped core; two current coils in inductive relation to and upon the other side of the armature, these current coils being provided with an E-shaped core upon the middle leg whereof they are located at different distances from the armature; and two magnetic deflectors, one at each outer leg of the E-shaped core, each deflector serving to deflect some of the flux from the armature that is due to the current coil further from the armature.

2. An induction watt meter including a closed conductor disc armature; a pressure coil in inductive relation to and upon one side of the armature and having a U-shaped core; two current coils in inductive relation to and upon the other side of the armature, these current coils being provided with an E-shaped core upon the middle leg whereof they are located at different distances from the armature; and two magnetic deflectors each serving to deflect some of the flux from the armature that is due to the current coil further from the armature and arranged to have the torques due to the deflectors in opposition.

3. An induction watt meter including a closed conductor disc armature; a pressure coil in inductive relation to and upon one side of the armature; two current coils in inductive relation to and upon the other side of the armature and located at different distances from the armature; and two magnetic deflectors each serving to deflect some of the flux from the armature that is due to the current coil further from the armature and arranged to have the torques due to the deflectors in opposition.

4. An induction watt meter including a closed conductor armature; a pressure winding and two current windings in inductive relation to the armature and each provided for inclusion in a working circuit distinct from the working circuit that includes the other; and a magnetic deflector for deflecting some of the flux due to one of the current windings from the meter armature.

5. An induction watt meter including a closed conductor armature; a pressure winding and two co-axial current windings in inductive relation to the armature and spaced apart longitudinally of their common axis and therefore being at different distances from the armature; and a magnetic deflector for deflecting some of the flux due to the current winding that is further from the meter armature.

6. An induction watt meter including a closed conductor disc armature; a pressure coil in inductive relation to and upon one side of the armature and having a U-shaped core; two current coils in inductive relation to and upon the other side of the armature, these current coils being provided with an E-shaped core upon the middle leg whereof they are located at different distances from the armature; and two magnetic deflectors, one at each outer leg of the E-shaped core, each deflector serving to deflect some of the flux from the armature that is due to the current coil further from the armature and arranged to have the torques due to the deflectors in opposition, said deflectors serving to equalize the torques due to said current windings, per unit of energy.

7. An induction watt meter including a closed conductor disc armature; a pressure coil in inductive relation to and upon one side of the armature and having a U-shaped core; two current coils in inductive relation to and upon the other side of the armature, these current coils being provided with an E-shaped core upon the middle leg whereof they are located at different distances from the armature; and two magnetic deflectors each serving to deflect some of the flux from the armature that is due to the current coil further from the armature and arranged to have the torques due to the deflectors in opposition, said deflectors serving to equalize the torques due to said current windings, per unit of energy.

8. An induction watt meter including a closed conductor disc armature; a pressure coil in inductive relation to and upon one side of the armature; two current coils in inductive relation to and upon the other side of the armature and located at different distances from the armature; and two magnetic deflectors each serving to deflect some of the flux from the armature that is due to the current coil further from the armature and arranged to have the torques due to the deflectors in opposition, said deflectors serving to equalize the torques due to said current windings, per unit of energy.

9. An induction watt meter including a closed conductor armature; a pressure winding and two co-axial current windings in inductive relation to the armature and spaced apart longitudinally of their common axis and therefore being at different distances from the armature; and a magnetic deflector for deflecting some of the flux due to the current winding that is further from the meter armature, said deflector serving to equalize the torques due to said current windings, per unit of energy.

In witness whereof, I hereunto subscribe my name this 19th day of January, A. D. 1920.

JESSE HARRIS.